United States Patent
Chen (10) Patent No.: US 12,291,306 B2
(45) Date of Patent: May 6, 2025

(54) CLIPLESS PEDAL DEVICE

(71) Applicant: WELLGO PEDAL'S CORP., Taichung (TW)

(72) Inventor: Chun-Rong Chen, Taichung (TW)

(73) Assignee: WELLGO PEDAL'S CORP., Taichung (TW)

(*) Notice: Subject to any disclaimer, the term of this patent is extended or adjusted under 35 U.S.C. 154(b) by 0 days.

(21) Appl. No.: 18/535,164

(22) Filed: Dec. 11, 2023

(65) Prior Publication Data
US 2024/0217616 A1 Jul. 4, 2024

(30) Foreign Application Priority Data
Dec. 29, 2022 (TW) .................................. 111214517

(51) Int. Cl.
*B62M 3/08* (2006.01)
(52) U.S. Cl.
CPC .................................... *B62M 3/086* (2013.01)
(58) Field of Classification Search
CPC .............................. B62M 3/086; B62M 3/08
See application file for complete search history.

(56) References Cited

U.S. PATENT DOCUMENTS

| | | | | |
|---|---|---|---|---|
| 9,969,460 B1* | 5/2018 | Chen | ...................... | B62M 3/086 |
| 2005/0252337 A1* | 11/2005 | Chen | ...................... | B62M 3/086 74/594.6 |
| 2012/0167711 A1* | 7/2012 | Hsieh | ...................... | B62M 3/086 74/594.6 |
| 2017/0267312 A1* | 9/2017 | Liao | ...................... | B62M 3/086 |
| 2024/0417029 A1* | 12/2024 | Chen | ...................... | B62M 3/08 |

FOREIGN PATENT DOCUMENTS

| CN | 108216480 A | * | 6/2018 | ............ B62M 3/086 |
|---|---|---|---|---|
| TW | M591951 U | | 3/2020 | |

OTHER PUBLICATIONS

Machine translation of CN-108216480-A, Chen Zhong-Yi, Jun. 29, 2018 (Year: 2018).*

* cited by examiner

*Primary Examiner* — Vinh Luong
(74) *Attorney, Agent, or Firm* — Muncy, Geissler, Olds & Lowe, P.C.

(57) ABSTRACT

A clipless pedal device is provided, including a pedal body; an engagement portion; a retaining portion, disposed on the pedal body and being movable between a lock position and a release position; a push portion, driven by the retaining portion to move along a pushing path; wherein when a cleat is engaged between the engagement portion and the retaining portion, the cleat is located on the pushing path; while the retaining portion is moved from the lock position to the release position, the push portion is moved along the pushing path to push the cleat.

7 Claims, 9 Drawing Sheets

CLIPLESS PEDAL DEVICE

BACKGROUND OF THE INVENTION

Field of the Invention

The present invention relates to a clipless pedal device.

Description of the Prior Art

In general, the connection between a bicycle pedal and a cleat positioned on the bottom of a bicycle shoe helps riders pedal easily. However, when inexperienced cyclists horizontally shift their foot to a critical point to disengage from the pedal, their cleats are easily accidentally disengaged from the pedal.

Regarding the issue above, the inventor of the present invention has invented a patent TW M591951. In patent TW M591951, a front engaging portion of a cleat is connected with a stopping portion of a pedal body; a rear engaging portion is restricted by the positioning structure to be prohibited from detaching upward. Moreover, the pedal body has a wear resistant pad. The first guiding face and the second guiding face of the stepped portion help the cleat rotate for detachment when the cleat rotates relative to the wear resistant pad, so that the cleat can slide outward along wing portions without getting blocked.

In above patent TW M591951, the two wing portions form inclined-structures by upwardly bending opposite sides of the wear resistant-pad, enabling the cleat to slide upward along the two wing portions. Although the aforementioned design is quite practical, the inventor is not satisfied with this. The inventor further studied and discovered that the two wing portions of the wear resistant pad do not move relative to the cleat when the cleat slides upward along one of the two wing portions. The cleat can be only detached by horizontally laterally shifting relative to one of the two wing portions, so that the smoothness of movement of the cleat only depends on the force exerted by the foot of the cyclists. Therefore, the ultimate goal for the inventor is to achieve 100% detachment of the cleat and save effort during horizontal movement of the cleat away from the pedal.

The present invention is, therefore, arisen to obviate or at least mitigate the above mentioned disadvantages.

SUMMARY OF THE INVENTION

An object of the present invention is to provide a clipless pedal device, which can lift a cleat when the cleat rotates laterally, allowing for easy upward detachment of the cleat.

To achieve the above and other objects, a clipless pedal device is provided, including: a pedal body, adapted for a cleat to be disposed thereon; an engagement portion, disposed on one end of the pedal bod and adapted for a first end portion of the cleat to be engaged therewith; a retaining portion, disposed on another end of the pedal body and being movable between a lock position and a release position, when the retaining portion is located at the lock position, a second portion of the cleat is restricted by the retaining portion; when the retaining portion is located at the release position, the second portion of the cleat is not restricted by the retaining portion; and a push portion, driven by the retaining portion to move along a pushing path; wherein when the cleat is engaged between the engagement portion and the retaining portion, the cleat is located on the pushing path; while the retaining portion is moved from the lock position to the release position, the push portion is moved along the pushing path to push the cleat.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

FIGS. 1 to 7 and 9 show a clipless pedal device according to a preferred embodiment of the present invention. The clipless pedal device 1 includes a pedal body 10, an engagement portion 20, a retaining portion 30 and a push portion 40.

The pedal body 10 is adapted for a cleat 2 which is disposed on a shoe to be disposed thereon. The retaining portion 20 is disposed on one end of the pedal body 10 and adapted for a first end portion 3 of the cleat 2 to be engaged therewith. The retaining portion 30 is disposed on another end of the pedal body 10 and is movable between a lock position and a release position. When the retaining portion 30 is located at the lock position, a second portion 4 of the cleat 2 is restricted by the retaining portion 30 (such as engagement, interference, or contact). When the retaining portion 30 is located at the release position, the second portion 4 of the cleat 2 is not restricted by the retaining portion 30. The push portion 40 is driven by the retaining portion 30 to move along a pushing path P. When the cleat 2 is engaged between the engagement portion 20 and the retaining portion 30, the cleat 2 is located on the pushing path P. While the retaining portion 30 is moved from the lock position to the release position, the push portion 40 is moved along the pushing path P to push the cleat 2. Therefore, the push portion 40 will lift the cleat 2 when the cleat 2 rotates laterally relative to the pedal body 10, enabling easy upward detachment of the cleat 2 from the pedal body 10.

In this embodiment, the engagement portion 20 is detachably assembled to (screwed to) the pedal body 10. The retaining portion 30 is pivotally connected to another end of the pedal body 10 to be pivoted between the lock position and the release position. In other embodiment, the engagement portion and the retaining portion are respectively integrally connected with the pedal body.

The clipless pedal device 1 further includes a spindle 5. The pedal body 10 is rotatably sleeved on the spindle 5, and the spindle 5 is assembled to a crank assembly.

The retaining portion 30 is moved from the lock position to the release position in a first direction L1. The push portion 40 includes a push surface 41 which is traverse to the first direction L1 and abutted against the cleat 2, so that the push surface 41 is adapted for the cleat 2 to be disposed thereon and push the cleat 2 to move upward. In this embodiment, the retaining portion 30 is connected with the pedal body 10 by a shaft portion 50, the shaft portion 50 defines an axis A, the retaining portion 30 is pivotable to the pedal body 10 around the axis A as a rotation center, the push portion 40 includes a pivot portion 42, and the pivot portion 42 is sleeved on the shaft portion 50, so as to be easily disassembled and stably rotated. Besides, the retaining portion 30 moves towards the first direction L1 to drive the push portion 40 to rotate.

The clipless pedal device 1 further includes a resilient member 60, the resilient member 60 is assembled to (sleeved on) the shaft portion 50 and resiliently abutted between the pedal body 10 and the retaining portion 30. The push portion 40 is normally resiliently pushed by the resilient member 60 in a direction that is opposite to the first direction L1. Therefore, the resilient member 60 provides a reverse force to resiliently push the push portion 40 to restore its position. Preferably, the clipless pedal device 1 further includes a torque adjustment mechanism 70. The torque adjustment mechanism 70 is disposed between the push portion 40 and the retaining portion 30. The torque adjustment mechanism 70 includes an adjustment member 71 and an adjustment bolt 72. The retaining portion 30 has a restriction hole 31. And an end portion 73 of the adjustment member 71 is disposed through the restriction hole 31, the end portion 73 of the adjustment member 71 is slidable relative to the restriction hole 31 on a slide path SP, and an insertion portion 43 of the push portion 40 is disposed through the restriction hole 31 and located on the slide path SP; so as to prevent the push portion 40 from swinging laterally.

The adjustment member 71 is normally resiliently pushed by the resilient member 60 in a direction that is opposite to the first direction L1. The adjustment member 71 is screwed on the adjustment bolt 72, and the adjustment bolt 72 is disposed through a through hole 32 of the retaining portion 30 and a perforation hole 44 of the push portion 40. Preferably, the adjustment bolt 72 has a passing section 74 disposed through the through hole 32. An outer diameter size of the through hole 32 is greater than an outer diameter size of the passing section 74. Specifically, the adjustment bolt 72 further includes a head portion 75 and a flange 76, the flange 76 is connected between the head portion 75 and the passing section 74, the head portion 75 is disposed through the perforation hole 44 in an assembly direction L2, and the flange 76 is blocked by the push portion 40 in the assembly direction L2. In this embodiment, the push portion 40 further includes a connection portion 45, the connection portion 45 is transverse to the push surface 41, the connection portion 45 has the perforation hole 44; the insertion portion 43 is transverse to the connection portion 45. Therefore, the head portion 75 can first pass through the perforation hole 44 in the assembly direction L2, then the passing section 74 is inserted into the through hole 32 in a direction which is opposite to the assembly direction L2, and the flange 76 is for position limitation of the adjustment bolt 72; thus, it is easy for users to assemble the adjustment bolt 72, and the adjustment bolt 72 is not easy to be detached from the push portion 40. Furthermore, the adjustment member 71 resiliently abuts against the flange 76 by the resilient member 60, so that the flange 76 of the adjustment bolt 72 can firmly abut against the push portion 40 to increase the connection strength.

Specifically, the cleat 2 is engaged between the engagement portion 20 and the retaining portion 30 and cannot be detached upwards from the pedal body 10 in a connection position.

Figure 1:
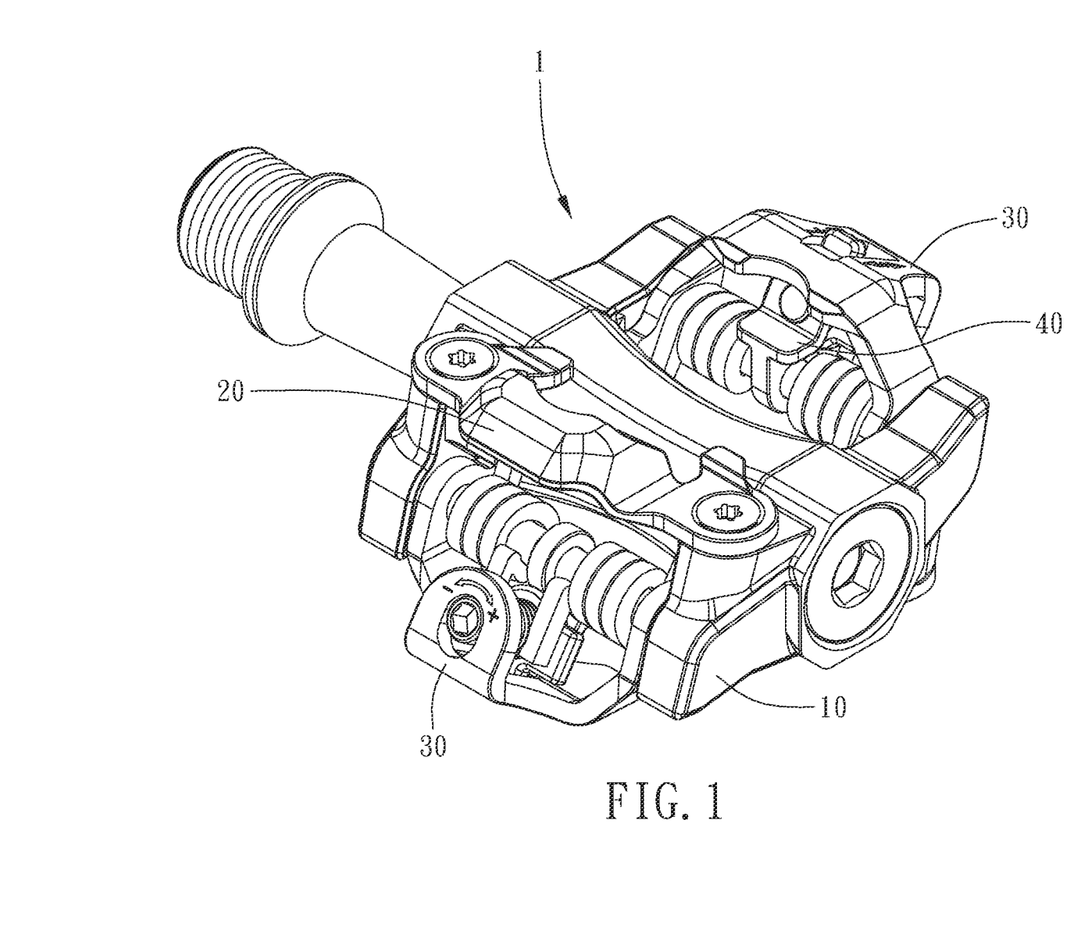
FIG. 1 a stereogram of a preferable embodiment of the present invention.
Figure 2:
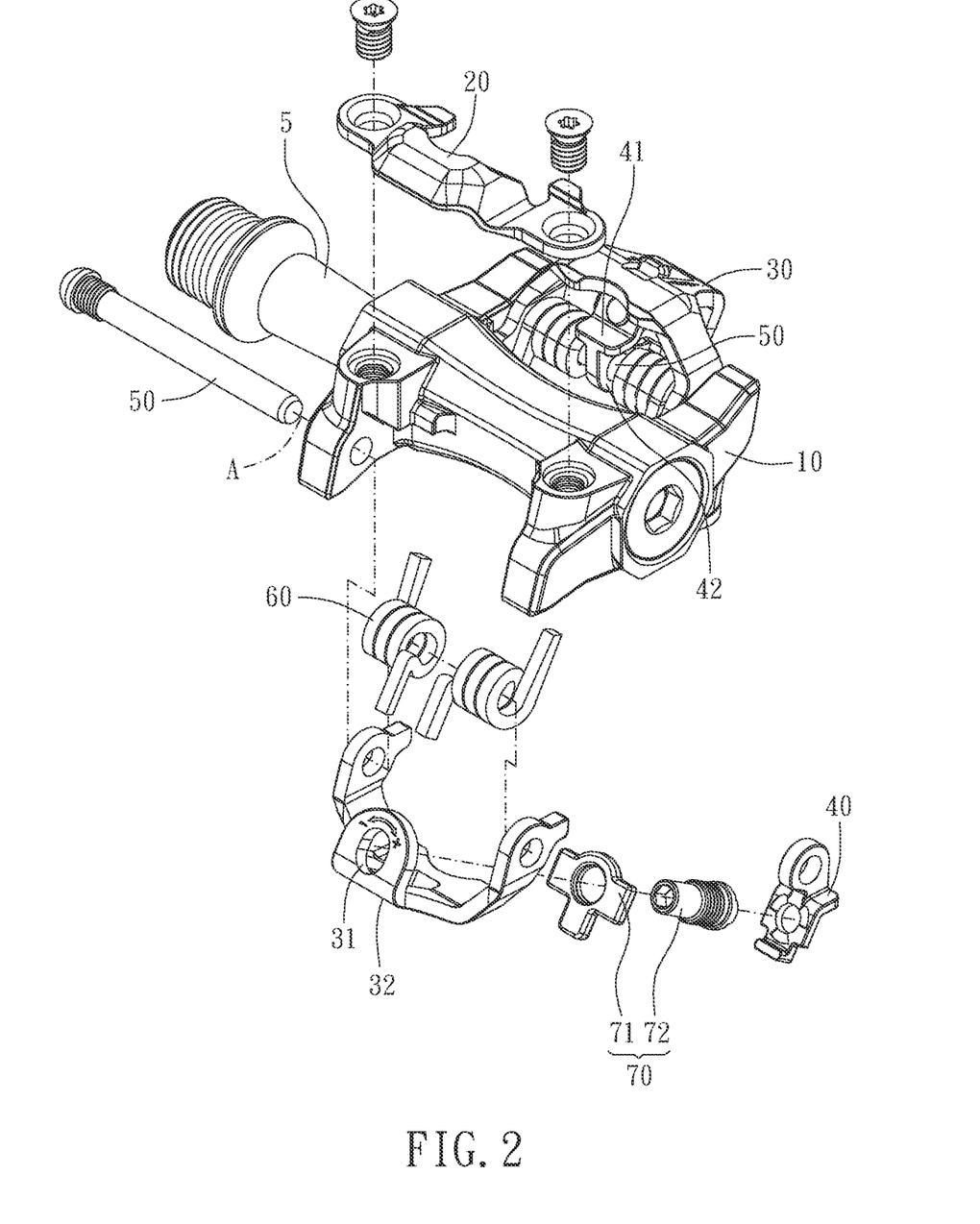
FIG. 2 is a breakdown drawing of the preferable embodiment of the present invention.
Figure 3:
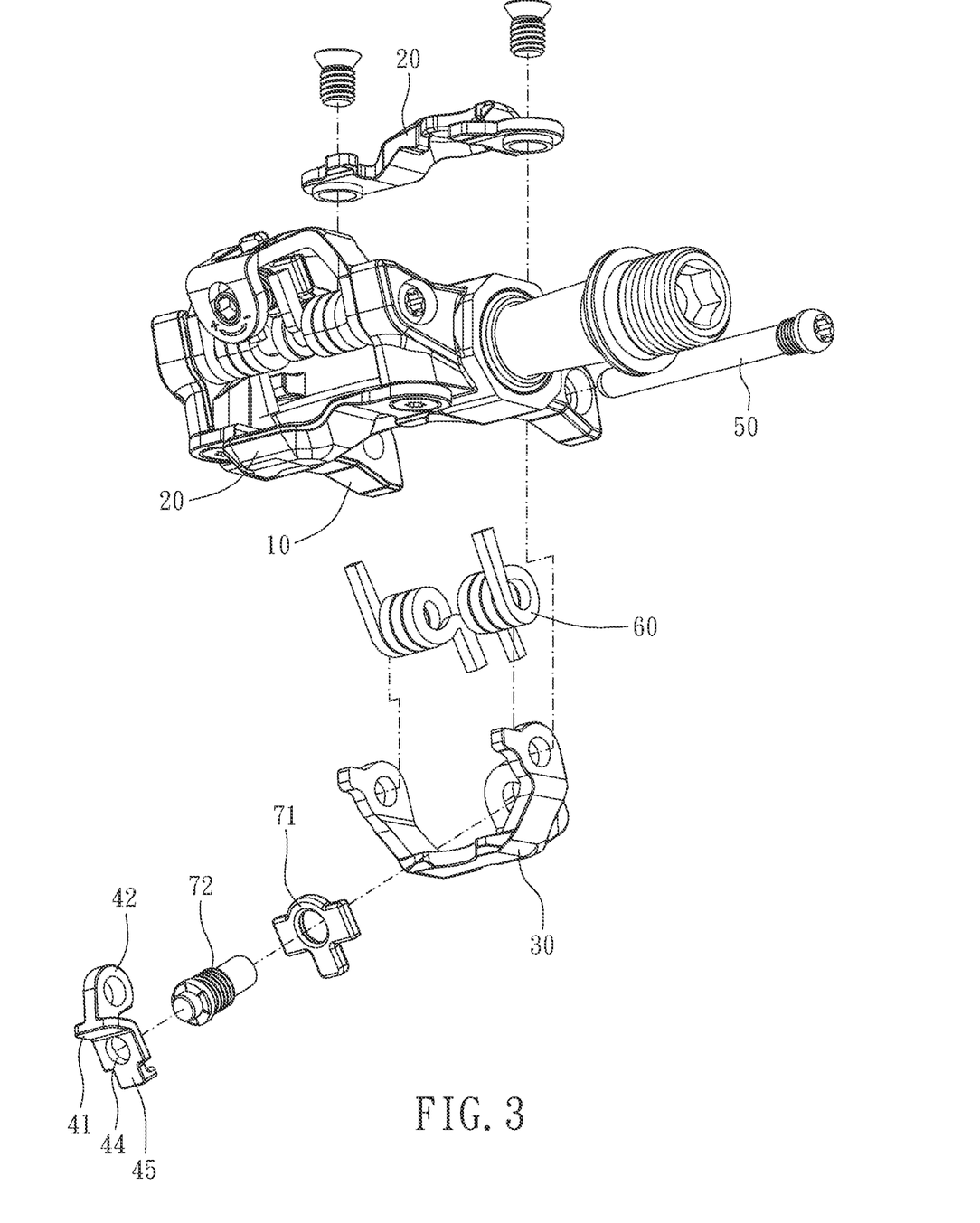
FIG. 3 is another breakdown drawing of the preferable embodiment of the present invention.
Figure 4:
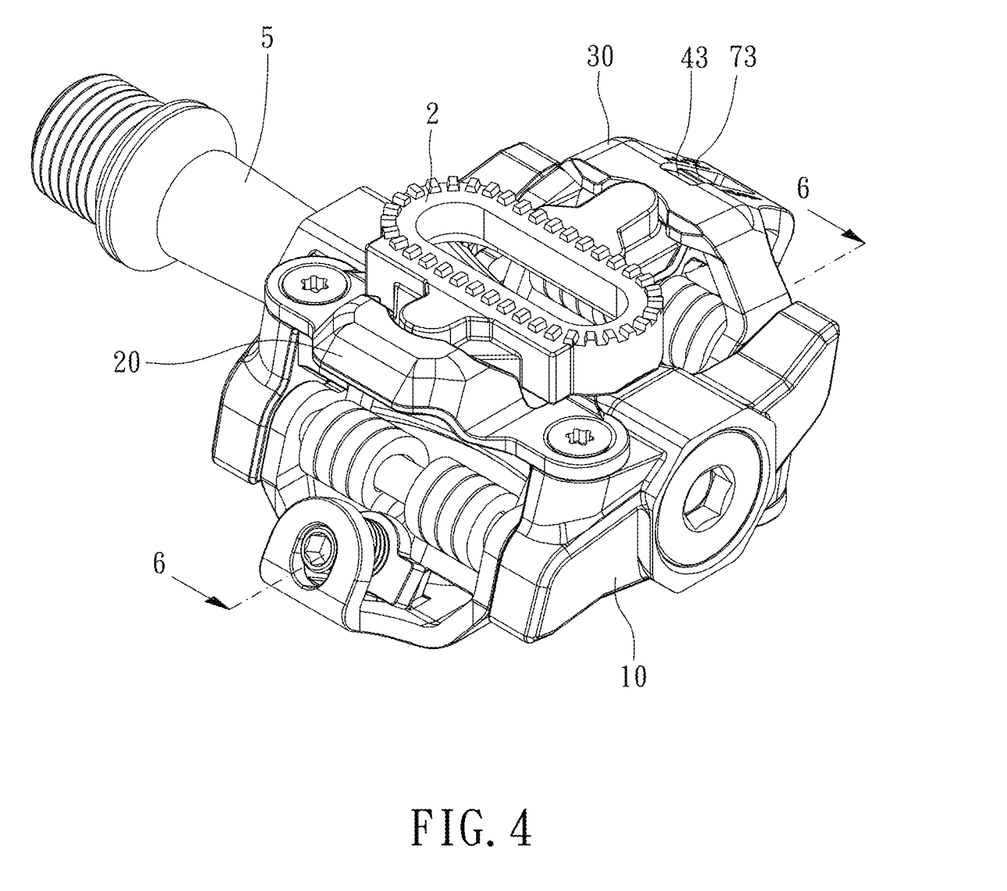
FIG. 4 is a stereogram of the preferable embodiment of the present invention connected with a cleat.
Figure 5:
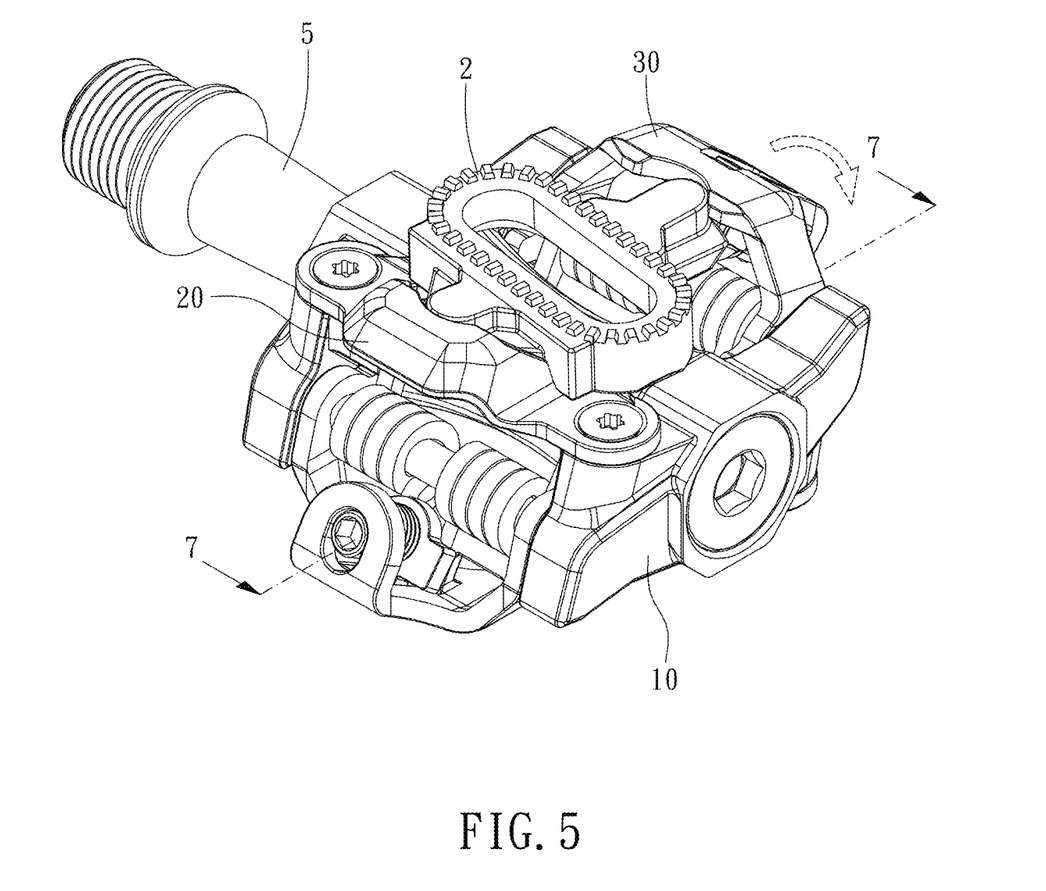
FIG. 5 is an illustration of a laterally rotation of a cleat of the preferable embodiment of the present invention.
Figure 6:
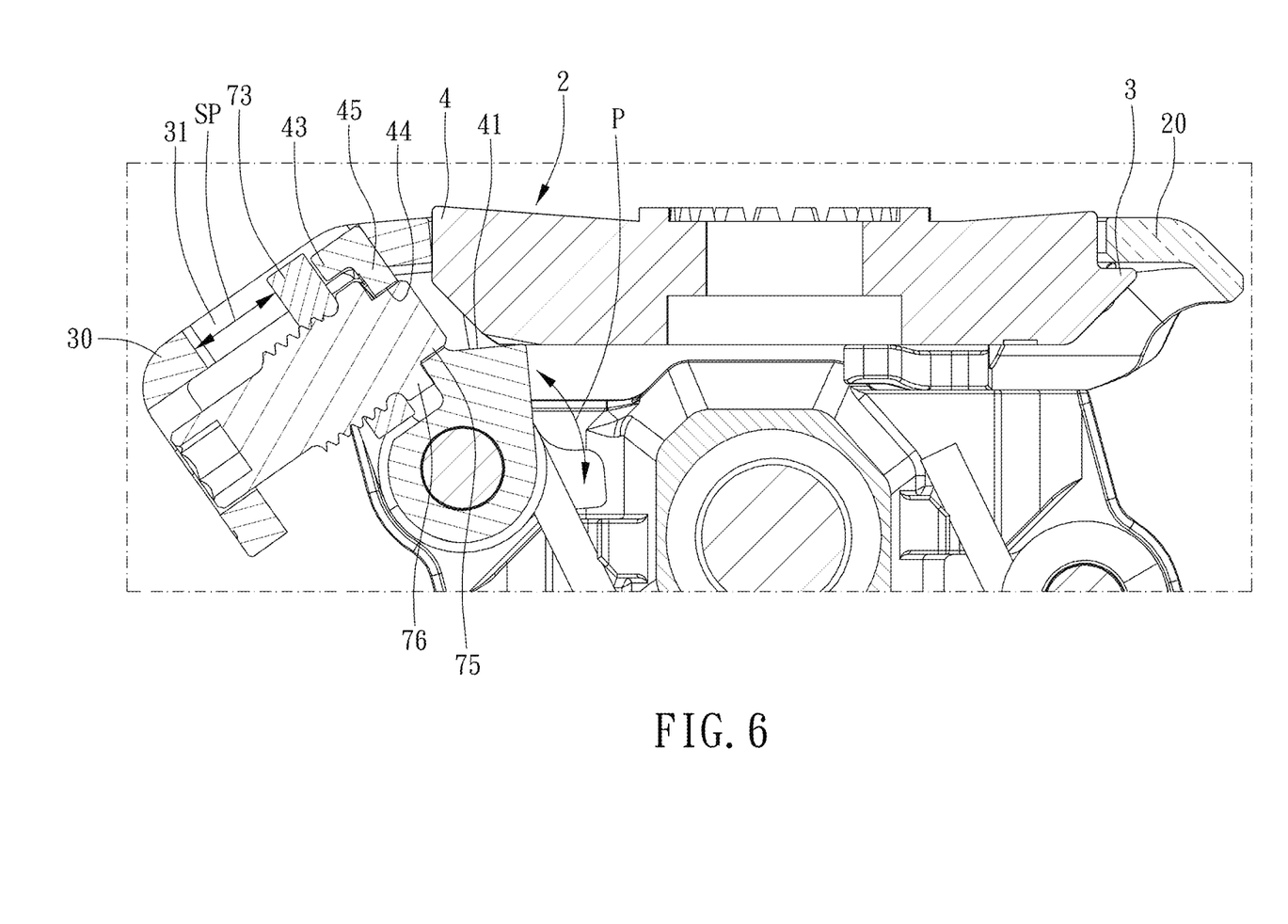
FIG. 6 is a cross-sectional view of the preferable embodiment of the present invention taken along line 6-6 of FIG. 4.
Figure 7:
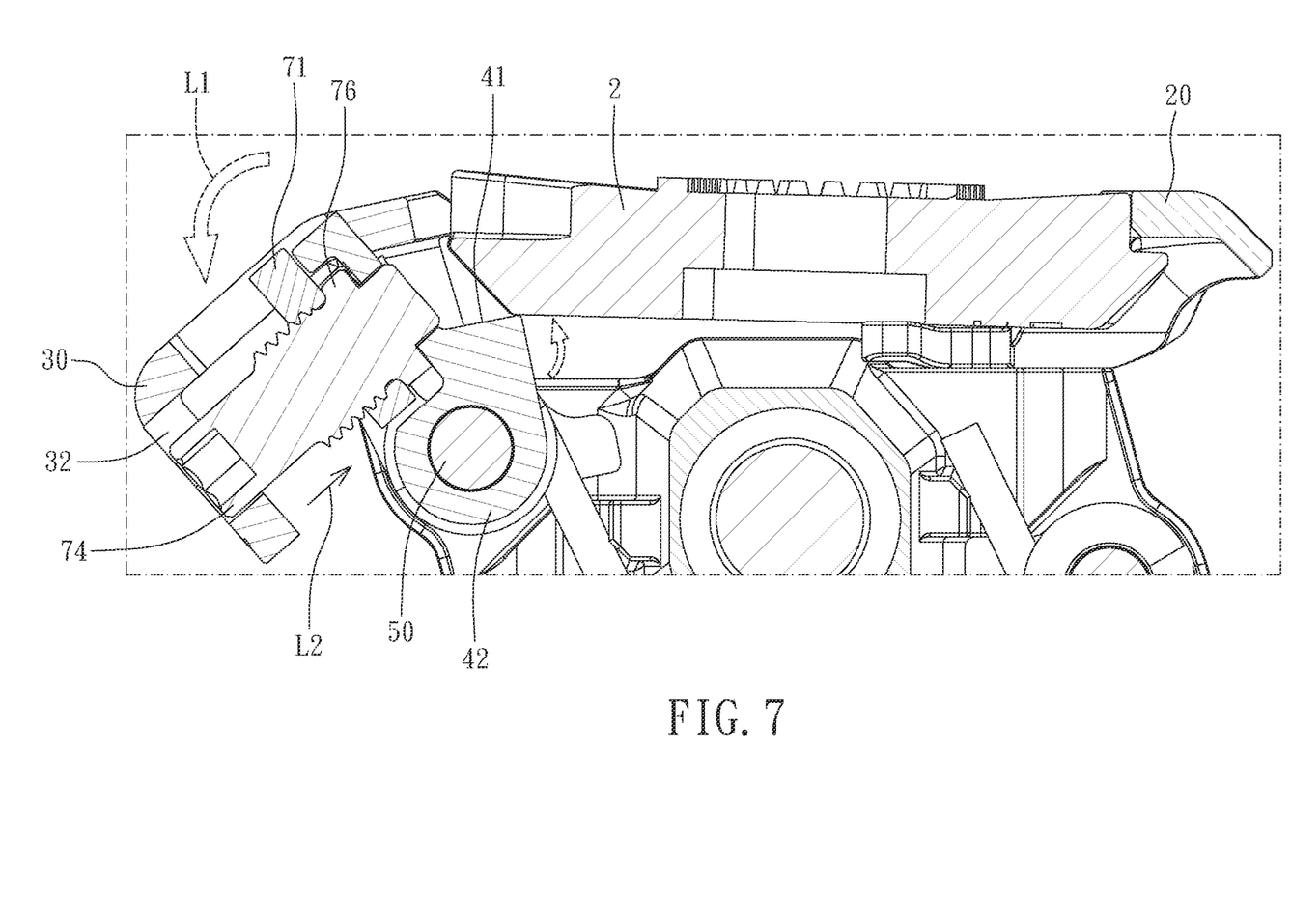
FIG. 7 is a cross-sectional view of the preferable embodiment of the present invention taken along line 7-7 of FIG. 5.

While the cleat 2 is rotated laterally from the connection position relative to the pedal body 10 for detachment (as shown in FIG. 5 to FIG. 7), the cleat 2 abuts against the retaining portion 30 to drive the retaining portion 30 to be gradually swung outwardly toward the first direction L1, and the push portion 40 is driven by the retaining portion 30 to upwardly abut against the cleat 2 for disengagement upward.

Specifically, the greater the laterally rotation angle of the cleat 2, the greater the upward distance the cleat 2 is pushed by the push portion 40. Therefore, it is easy for the cleat 2 to laterally and upwardly be detached from the pedal body 10.

In this embodiment, the clipless pedal device 1 has a plurality of said engagement portions 20, a plurality of said retaining portions 30, a plurality of said push portions 40, a plurality of said torque adjustment mechanisms 70 and a plurality of said resilient members 60. Specifically, each of the plurality of push portions 40 has the same structure and connection with other elements.

Figure 8:
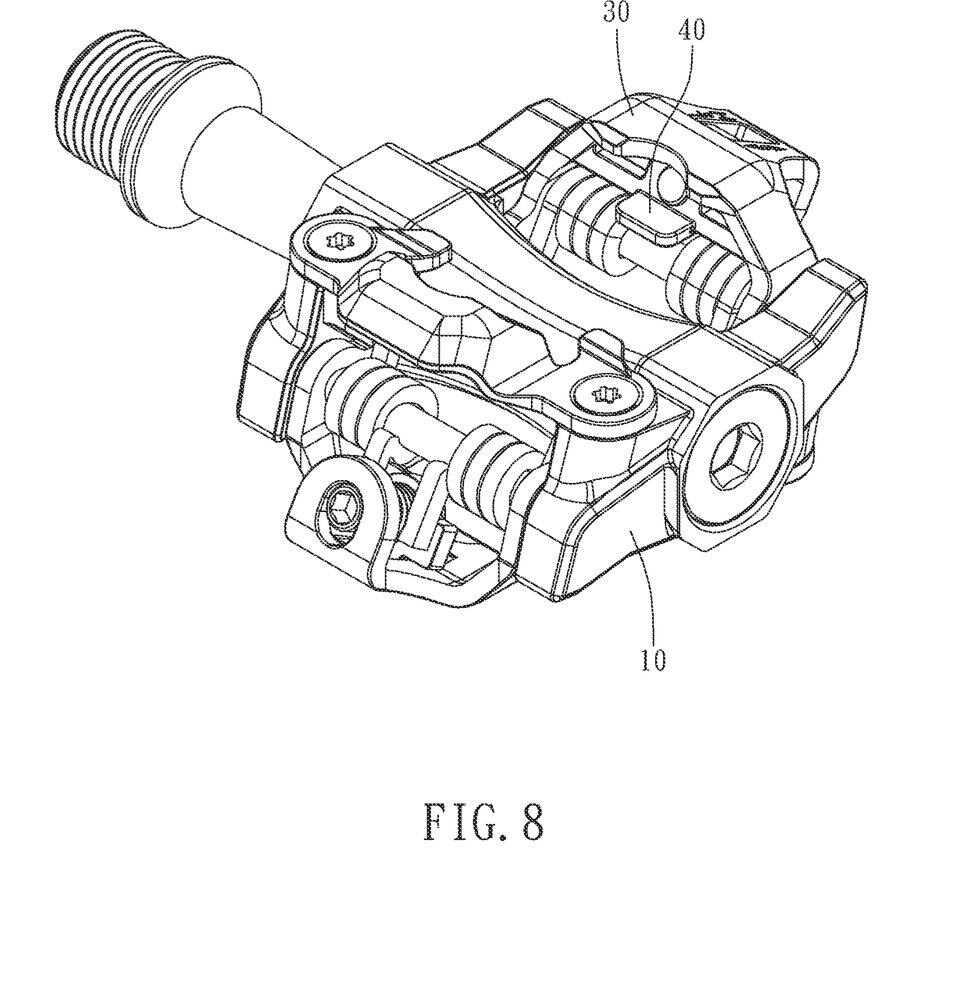
FIG. 8 is a stereogram of another preferable embodiment of the present invention.
Figure 9:
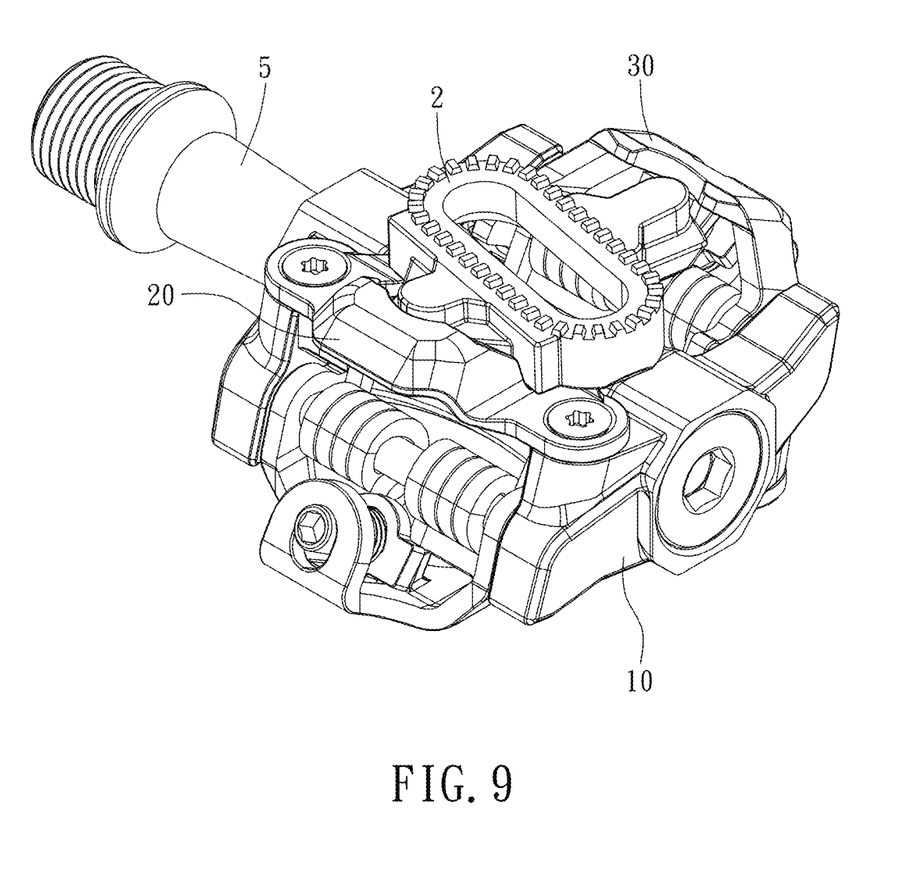
FIG. 9 is a drawing of a retaining portion in a release position of the preferable embodiment of the present invention.

Please refer to FIG. 8 showing another embodiment of the present invention. The push portion 40 is integrally connected with the retaining portion 30; therefore, the push portion 40 and the retaining portion 30 are not easily separated and have a strong connection between them.

In summary, the push portion is driven by the retaining portion to move the cleat upward when the cleat is rotated laterally. Therefore, the cleat can be easily detached.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A clipless pedal device, including:
a pedal body, adapted for a cleat to be disposed thereon;
an engagement portion, disposed on one end of the pedal body and adapted for a first end portion of the cleat to be engaged therewith;
a retaining portion, disposed on another end of the pedal body and being movable between a lock position and a release position, when the retaining portion is located at the lock position, a second portion of the cleat is restricted by the retaining portion; when the retaining portion is located at the release position, the second portion of the cleat is not restricted by the retaining portion; and
a push portion, driven by the retaining portion to move along a pushing path;
wherein when the cleat is engaged between the engagement portion and the retaining portion, the cleat is located on the pushing path; while the retaining portion is moved from the lock position to the release position, the push portion is moved along the pushing path to push the cleat;
wherein the retaining portion is connected with the pedal body by a shaft portion, the shaft portion defines an axis, the retaining portion is pivotable to the pedal body around the axis as a rotation center, the push portion includes a pivot portion, and the pivot portion is sleeved on the shaft portion;

wherein the retaining portion is moved from the lock position to the release position in a first direction, the clipless pedal device further includes a resilient member, the resilient member is assembled to the shaft portion and is resiliently abutted between the pedal body and the retaining portion, and the push portion is normally resiliently pushed by the resilient member in a direction that is opposite to the first direction;

wherein the clipless pedal device further includes a torque adjustment mechanism, the torque adjustment mechanism is disposed between the push portion and the retaining portion, the torque adjustment mechanism includes an adjustment member and an adjustment bolt, the adjustment member is normally resiliently pushed by the resilient member in a direction that is opposite to the first direction, the retaining portion has a restriction hole, an end portion of the adjustment member is disposed through the restriction hole, the end portion of the adjustment member is slidable relative to the restriction hole on a slide path, and an insertion portion of the push portion is disposed through the restriction hole and located on the slide path.

2. The clipless pedal device of claim 1, wherein the push portion includes a push surface which is traverse to the first direction and abutted against the cleat.

3. The clipless pedal device of claim 1, wherein the adjustment member is screwed on the adjustment bolt, and the adjustment bolt is disposed through a through hole of the retaining portion and a perforation hole of the push portion.

4. The clipless pedal device of claim 3, wherein the adjustment bolt has a passing section disposed through the through hole, and an outer diameter size of the through hole is greater than an outer diameter size of the passing section.

5. The clipless pedal device of claim 3, wherein the push portion includes a push surface which is traverse to the first direction and abutted against the cleat, the push portion further includes a connection portion, the connection portion is transverse to the push surface, and the connection portion has the perforation hole.

6. The clipless pedal device of claim 5, wherein the adjustment bolt has a passing section disposed through the through hole, and an outer diameter size of the through hole is greater than an outer diameter size of the passing section; the push portion further includes a connection portion, the connection portion is transverse to the push surface, and the connection portion has the perforation hole; the adjustment bolt further includes a head portion and a flange, the flange is connected between the head portion and the passing section, the head portion is disposed through the perforation hole in an assembly direction, the flange is blocked by the push portion in the assembly direction; and the insertion portion is transverse to the connection portion.

7. The clipless pedal device of claim 1, wherein the push portion and the retaining portion are integrally connected with each other.

* * * * *